(12) United States Patent
Huszar

(10) Patent No.: US 11,410,076 B1
(45) Date of Patent: Aug. 9, 2022

(54) DECENTRALIZED MULTI-TASK MACHINE LEARNED PARAMETERS

(71) Applicant: Twitter, Inc., San Francisco, CA (US)

(72) Inventor: Ferenc Huszar, Cambridge (GB)

(73) Assignee: Twitter, Inc., San Francisco, CA (US)

( * ) Notice: Subject to any disclaimer, the term of this patent is extended or adjusted under 35 U.S.C. 154(b) by 798 days.

(21) Appl. No.: 16/125,545

(22) Filed: Sep. 7, 2018

(51) Int. Cl.
*G06N 20/00* (2019.01)
*G06F 17/13* (2006.01)
*G06F 16/21* (2019.01)

(52) U.S. Cl.
CPC ............ *G06N 20/00* (2019.01); *G06F 16/219* (2019.01); *G06F 17/13* (2013.01)

(58) Field of Classification Search
CPC .......... G06F 17/13; G06F 17/11; G06F 17/10; G06F 17/00; G06F 16/20; G06F 16/21; G06F 16/219; G06N 20/00; G06N 20/10; G06N 20/20

See application file for complete search history.

(56) References Cited

U.S. PATENT DOCUMENTS

| | | | | |
|---|---|---|---|---|
| 2011/0016065 A1* | 1/2011 | Chapelle | ................ | G06N 20/00 706/12 |
| 2014/0032187 A1* | 1/2014 | Legbedji | ................ | G06F 30/20 703/2 |
| 2015/0161988 A1* | 6/2015 | Dognin | ................ | G06N 3/08 704/232 |

OTHER PUBLICATIONS

Anonymous, "Generation and Consolidation of Recollections for Efficient Deep Lifelong Learning", ICLR 2018, 17 pages.
Georgopoulos, et al., "Distributed machine learning in networks by consensus", Neurocomputing, vol. 124, Jan. 26, 2014, 11 pages.
Huszar, "On Quadratic Penalties in Elastic Weight Consolidation", arXiv, Dec. 12, 2017, 5 pages.
Kirkpatrick, et al., "Overcoming catastrophic forgetting in neural networks", PNAS, vol. 114, No. 13, Mar. 28, 2017, pp. 3521-3526.
Krauth, et al., "Learning algorithms with optimal stability in neural networks", Journal of Physics A: Mathematical and General, vol. 20, No. 11, 1987, 8 pages.
Poole, et al., "Intelligent synapses for multi-task and transfer learning", ICLR 2017, 2017, 4 pages.
Smola, et al., "Laplace Propagation", NIPS, 2004, 8 pages.

* cited by examiner

*Primary Examiner* — Mohamed Charioui
(74) *Attorney, Agent, or Firm* — Brake Hughes Bellermann LLP

(57) ABSTRACT

A method includes generating a quadratic penalty based on a first version of a parameter, a first version of the anchor point and a set of Hessian values, training a task using the quadratic penalty, determining a second version of the parameter based on the trained task, determining a second version of the anchor point for the task based a trained task, generating Hessian values for the task based on the trained task, calculating a loss value for a portion of the plurality of tasks based on the second version of the parameter, calculating a loss value for each of the remainder of the plurality of tasks, determining if the loss value satisfies a condition, and in response to determining the loss value satisfies the condition, replace the first version of the parameter with the second version of the parameter in a parameter datastore and in the version control datastore.

20 Claims, 6 Drawing Sheets

DECENTRALIZED MULTI-TASK MACHINE LEARNED PARAMETERS

FIELD

Implementations relate to machine learning models and parameters used across multiple tasks in an artificial intelligence environment.

BACKGROUND

Typically an organization maintains multiple artificial intelligence applications each powered by one or more machine learning models specialized at solving a specific task or set of tasks. The parameters describing these machine learning models typically do not overlap and are typically stored on separate storage systems (e.g., databases, look-up tables and the like). Each model is created, updated and/or maintained using a corresponding source task and source dataset. An advantage of this approach is that machine models can be owned, created, trained and/or maintained by separate teams asynchronously with little or no co-ordination needed. One drawback of this approach is that each machine learning model is only based on a single source task or source dataset, so each model benefits from only a limited view of all information available to the organization about the users or entities the model relates to.

For a machine learning model to incorporate multiple views, thereby increasing its generalization ability, it would often be beneficial for the machine learning model to be trained, updated and/or maintained using multiple source tasks and/or datasets, or for multiple models to share a subset of their parameters. This is called multi-task or transfer learning. Transfer learning has the potential to increase models' ability to generalize, or could reduce the amount of training data or training time required to achieve a certain performance. In addition, transfer learning may allow the organization to create machine learning-based solutions targeting tasks where only limited or no direct training data is available. Multi-task learning, however, increases the complexity of creating, training, updating and/or maintaining such models, and models relating to different source tasks or source datasets could no longer be created, trained, updated and/or maintained in an asynchronous fashion.

SUMMARY

Example implementations can allow multiple machine learning models to share a subset of parameters, while retaining the ability for these machine learning systems to be created, trained, updated and/or maintained asynchronously with minimal co-ordination. The shared set of parameters can allow for transfer learning between models and corresponding tasks and/or datasets. Thus allowing each model to benefit from multiple views on the data available to the organization. This can be achieved by maintaining a central parameter server storing the parameters shared by multiple machine learning models, alongside other data required the coordination of how these parameters are updated and maintained. A protocol can ensure that as new models using the shared parameters are created, or existing models are trained or updated, or removed from the system, the shared parameters are updated such that the performance of the remaining models can remain approximately the same with the updated value of the parameters as the model was before the update.

In a general aspect a method and a non-transitory computer-readable storage medium having stored thereon computer executable program code which, when executed on a computer system, causes the computer system to perform steps. The steps include reading a first version of a parameter corresponding to an input of a task from a version control datastore, reading a first version of an anchor point for the task from the version control datastore, reading a set of Hessian values for a plurality of tasks including the task from the version control datastore, generating a quadratic penalty based on the first version of the parameter, the first version of the anchor point and the set of Hessian values, training the task using the quadratic penalty, determining a second version of the parameter based on the trained task, determining a second version of the anchor point for the task based on the trained task, generating Hessian values for the task based on the trained task, calculating a loss value for a portion of the plurality of tasks based on the second version of the parameter, calculating a loss value for each of the remainder of the plurality of tasks, determining if the loss value satisfies a condition, and in response to determining the loss value satisfies the condition, replace the first version of the parameter with the second version of the parameter in a parameter datastore and in the version control datastore.

In another general aspect a system includes a parameter server and a task node. The parameter server includes a version control datastore and a parameter datastore. The task node is communicatively coupled to the parameter server and is configured to read a first version of a parameter corresponding to an input of a task from the version control datastore, read a first version of an anchor point for the task from the version control datastore, read a set of Hessian values for a plurality of tasks including the task from the version control datastore, generate a quadratic penalty based on the first version of the parameter, the first version of the anchor point and the set of Hessian values, train the task using the quadratic penalty, determine a second version of the parameter based on the trained task, determine a second version of the anchor point for the task based on the trained task, generate Hessian values for the task based on the trained task. The parameter server is configured to calculate a loss value for a portion of the plurality of tasks based on the second version of the parameter, calculate a loss value for each of the remainder of the plurality of tasks, determine if the loss value satisfies a condition, and in response to determining the loss value satisfies the condition, replace the first version of the parameter with the second version of the parameter in the parameter datastore and in the version control datastore.

Implementations can include one or more of the following features. For example, in response to determining the loss value does not satisfy the condition, discard the second version of the parameter, the second version of the anchor point, and the Hessian values for the task. In response to determining the loss value satisfies the condition, storing the second version of the anchor point, and the Hessian values for the task in the version control datastore. If the task is a first task, assigning a first importance to the first task, assigning a second importance to a second task, the first task and the second task being included in the portion of the plurality of tasks and the second task being configured to use at least a portion of the first version of the parameter as an input, and the calculating of the loss value for the portion of the plurality of tasks can be further based on the first importance and the second importance.

For example, the training of the task using the quadratic penalty can include optimizing the quadratic penalty until convergence, the determining of the second version of the parameter includes selecting a first matrix from the optimized quadratic penalty, the determining of the second version of the anchor point includes selecting a second matrix from the optimized quadratic penalty, and the generating of the Hessian values for the task includes generating a Fisher information matrix for the task based on the second version of the parameter. The calculating of the loss value for the portion of the plurality of tasks can include using the quadratic penalty as a loss function, and the calculating of the loss value for each of the remainder of the plurality of tasks using the quadratic penalty as the loss function. The calculating of the loss value for the portion of the plurality of tasks can include using a regression loss function, and the calculating of the loss value for each of the remainder of the plurality of tasks using the regression loss function.

For example, if determining the reading of the first version of the parameter does not return a result, in response to determining the reading of the first version of the parameter does not return a result, generating a new parameter, assigning values to the new parameter, and zero-padding the new parameter. If determining the reading of the first version of an anchor point does not return a result, in response to determining the reading of the first version of an anchor point does not return a result, generating a new anchor point, assigning values to the new anchor point, and zero-padding the new anchor point. If determining the reading of the set of Hessian values for the plurality of tasks does not return a result for at least one of the plurality of tasks, and in response to determining the reading of the set of Hessian values for the plurality of tasks does not return a result for the at least one of the plurality of tasks, generating new Hessian values for each of the at least one of the plurality of tasks, assigning values to the new Hessian values for each of the at least one of the plurality of tasks, and zero-padding the new Hessian values for each of the at least one of the plurality of tasks. Two or more of the plurality of tasks can be trained asynchronously. The plurality of tasks can include at least one source task communicatively coupled to the parameter datastore, the at least one source task being configured as a machine learning task and to train parameters stored in the parameter datastore, and at least one target task communicatively coupled to the parameter datastore, the at least one target task being configured as a machine learning prediction task or an optimization task and to use parameters stored in the parameter datastore as input to the at least one target task.

For example, the parameter datastore can includes at least one look-up table that stores a plurality of parameters as real-valued vectors having a dimensionality corresponding to a number of input parameters associated with at least one of the plurality of tasks, and the version control datastore can include at least one look-up table that stores data associated with the plurality of parameters as real-valued vectors having a dimensionality corresponding to a number of input parameters associated with at least one of the plurality of tasks.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations and wherein.

Figure 1:
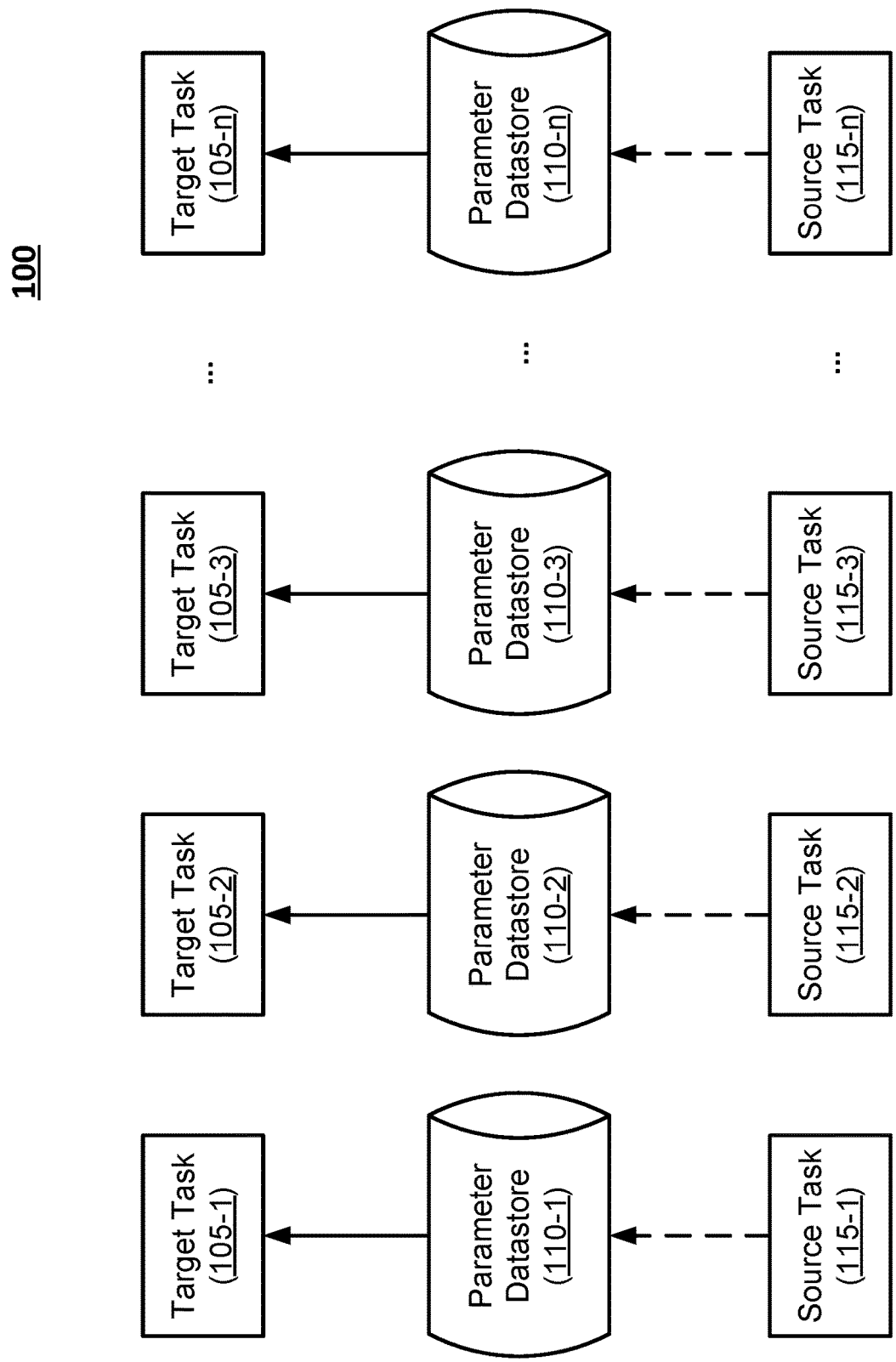
FIG. 1 illustrates a block diagram of an artificial intelligence environment where each machine learning task is handled in isolation. Parameters for the model for each task are trained only on that task.

It should be noted that these Figures are intended to illustrate the general characteristics of methods, structure and/or materials utilized in certain example implementations and to supplement the written description provided below. These drawings are not, however, to scale and may not precisely reflect the precise structural or performance characteristics of any given implementation, and should not be interpreted as defining or limiting the range of values or properties encompassed by example implementations. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

FIG. 1 illustrates a block diagram of an artificial intelligence environment where each machine learning task is handled in isolation. Parameters for the model for each task are trained only on that task. As shown in FIG. 1, an artificial intelligence environment 100 includes a plurality of parameter datastores 110-1, 110-2, 110-3, 110-$n$, a plurality of target tasks 105-1, 105-2, 105-3, 105-$n$, and a plurality of source tasks 115-1, 115-2, 115-3, 115-$n$.

Each of the plurality of source tasks 115-1, 115-2, 115-3, 115-$n$ can be a machine learning task used to train the parameters stored in the corresponding parameter datastore 110-1, 110-2, 110-3, 110-$n$. For example, each of the plurality of source tasks 115-1, 115-2, 115-3, 115-$n$ can be configured to use an algorithm to create, update and/or maintain the parameters stored in the corresponding parameter datastore 110-1, 110-2, 110-3, 110-$n$. In an example implementation, source task 115-1 can use a first algorithm, source task 115-2 can use a second algorithm, source task 115-3 can use a third algorithm and source task 115-$n$ can use a nth algorithm. An example algorithm can be (or be based on) a singular value decomposition (SVD) over a follower graph.

Each of the plurality of target tasks 105-1, 105-2, 105-3, 105-*n* can be a machine learning task that uses the parameters stored in the corresponding parameter datastore 110-1, 110-2, 110-3, 110-*n* as input. The machine learning task can be a prediction or optimization task. For example, the machine learning task can be implemented as a product feature (e.g., a recommender system, an advertisement system and the like).

The parameter datastore 110-1, 110-2, 110-3, 110-*n* can be a database, a look-up table and the like. The parameter datastore 110-1, 110-2, 110-3, 110-*n* can also be referred to as an embedding. The parameter datastore 110-1, 110-2, 110-3, 110-*n* can store a real-valued vector or vectors. The values for the parameters can be calculated from raw features on-demand via, for example, a neural network. In an example implementation, a look-up-table is compressed using hashing. The parameters can also be referred to as a representation where a set of parameters represent a particular target task or plurality of target tasks performing a function (e.g., ads, timelines, events, and the like).

In the artificial intelligence environment 100 illustrated in FIG. 1, each target task 105-1, 105-2, 105-3, 105-*n* is independent of each other. In other words, target task 105-1 is independent of target task 105-2, 105-3 and 105-*n*. In addition, each source task 115-1, 115-2, 115-3, 115-*n* is independent of each other. In other words, source task 115-1 is independent of source task 115-2, 115-3 and 115-*n*. Further, the parameter datastore 110-1, 110-2, 110-3, 110-*n* are separate for different target tasks 105-1, 105-2, 105-3, 105-*n* and their corresponding source task 115-1, 115-2, 115-3, 115-*n*. In other words, source task 115-1 is used to train parameters in parameter datastore 110-1 and the trained parameters in parameter datastore 110-1 are used by target task 105-1. Accordingly, there is no multi-task or transfer learning occurring. The models are isolated, coordination is minimal, but the models may not benefit from each other.

Figure 2:
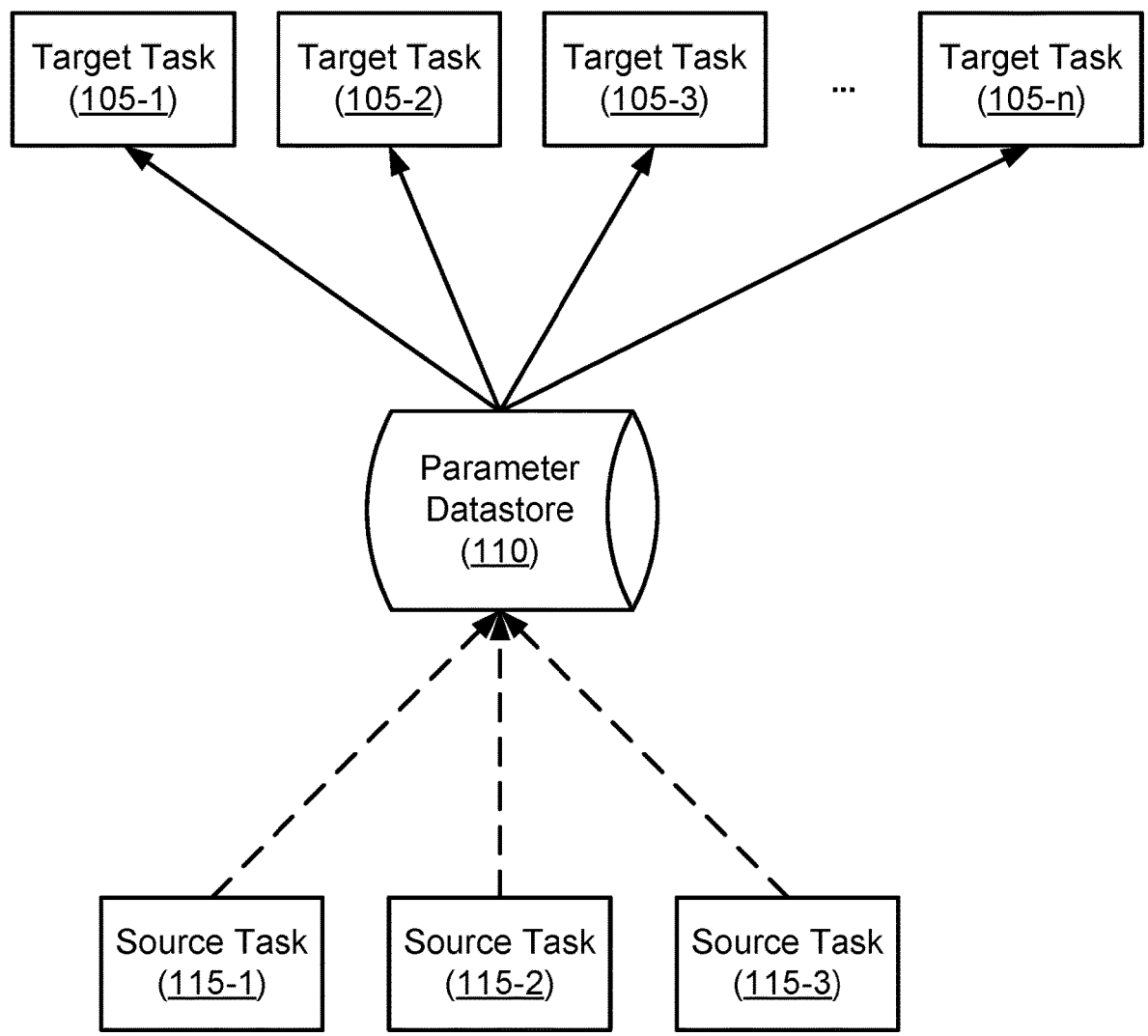
FIG. 2 illustrates a block diagram of an artificial intelligence environment with transfer learning multiple source tasks and multiple target tasks according to at least one example embodiment.

In an example implementation, parameters associated with multiple models are stored in a common storage system (e.g., database, look-up tables and the like). Further, source tasks are used to train the parameters and target tasks use the trained parameters. FIG. 2 illustrates a block diagram of an artificial intelligence environment with transfer learning multiple source tasks and multiple target tasks according to at least one example implementation. The source tasks can be used to train a set of global model parameters, which are then used by the models built for the target tasks. In this implementation, the target tasks may not contribute to training the global parameters. As shown in FIG. 2, an artificial intelligence environment 200 includes parameter datastore 110, a plurality of target tasks 105-1, 105-2, 105-3, 105-*n*, and a plurality of source tasks 115-1, 115-2, 115-3.

Each of the plurality of source tasks 115-1, 115-2, 115-3 can be a machine learning task used to train the parameters stored in the parameter datastore 110. For example, each of the plurality of source tasks 115-1, 115-2, 115-3 can be configured to use an algorithm to create, update and/or maintain the parameters stored in the parameter datastore 110. In an example implementation, source task 115-1 can use a first algorithm, source task 115-2 can use a second algorithm and source task 115-3 can use a third algorithm. An example algorithm can be (or be based on) a singular value decomposition (SVD) over a follower graph.

Each of the plurality of target tasks 105-1, 105-2, 105-3, 105-*n* can be a machine learning task that uses the parameters stored in the parameter datastore 110 as input. The machine learning task can be a prediction or optimization task. For example, the machine learning task can be implemented as a product feature (e.g., a recommender system, an advertisement system and the like).

The parameter datastore 110 can be a database, a look-up table and the like. The parameter datastore 110 can also be referred to as an embedding. The parameter datastore 110 can store a real-valued vector or vectors. The values for the parameters can be calculated from raw features on-demand via, for example, a neural network. In an example implementation, a look-up-table is compressed using hashing. The parameters can also be referred to as a representation where a set of parameters represent a particular target task or plurality of target tasks performing a function (e.g., ads, timelines, events, and the like). Accordingly sharing representations across target tasks can allow (1) the representations increase accuracy of machine learning models on target tasks that use the representation; (2) the representations can increase generalization (e.g., allow building machine learning models in new tasks with limited training data; (3) the representations can simplify new model development; and (4) the representations can be used as a form of transfer learning (e.g., to allow target tasks to benefit from adding more source tasks to train the representations).

Figure 3:
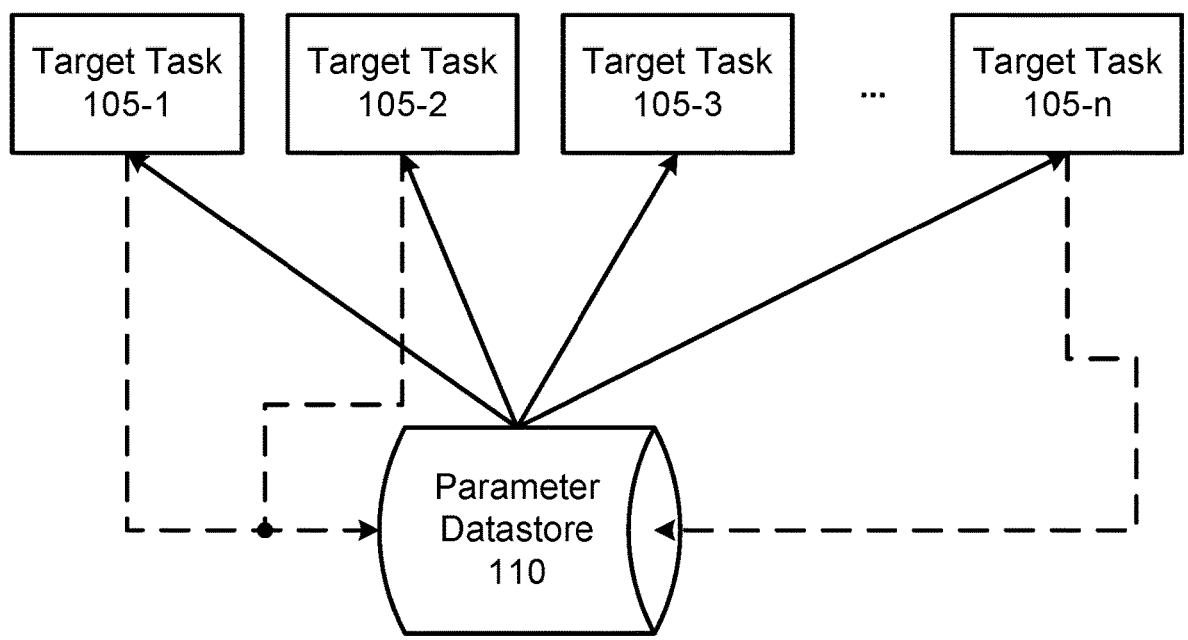
FIG. 3 illustrates a block diagram of an artificial intelligence environment including target tasks according to at least one example embodiment.

In an example implementation, parameters associated with multiple models are stored in a common storage system (e.g., database, look-up tables and the like). Further, target tasks can be used to train parameters and use the trained parameters. FIG. 3 illustrates a block diagram of an artificial intelligence environment including target tasks according to at least one example implementation. As shown in FIG. 3, an artificial intelligence environment 300 includes the parameter datastore 110 and the plurality of target tasks 105-1, 105-2, 105-3, 105-*n*.

According to at least one example implementation, a subset of the plurality of target tasks 105-1, 105-2, 105-3, 105-*n* can be used as source (and target) tasks to create, update and/or maintain the parameters stored in the parameter datastore 110. In an example implementation, target tasks 105-1, 105-2 and 105-*n* (as indicated by the dashed line) can be used as a source task. Accordingly, the machine learning task (e.g., a machine learning prediction task, a machine learning optimization task, and the like) can be used in place of a source task algorithm to create, update and/or maintain the parameters stored in the parameter datastore 110.

Figure 4:
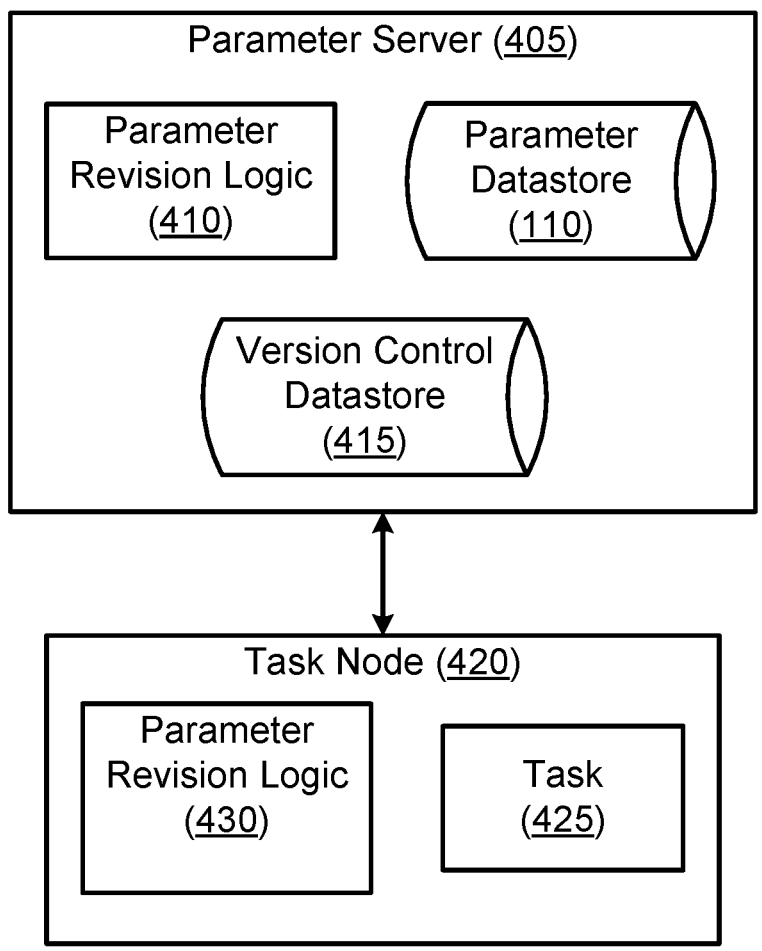
FIG. 4 illustrates a block diagram of system according to at least one example embodiment.

FIG. 4 illustrates a block diagram of system according to at least one example implementation. As shown in FIG. 4, a system 400 includes a parameter server 405 and a task node 420. The parameter server 405 and the task node 420 are communicatively coupled via, for example, an intranet or the internet. The parameter server 405 includes a parameter revision logic 410 and the task node includes a parameter revision logic block 430. The parameter server 405 further includes the parameter datastore 110 and a version control datastore 415. The task node 420 further includes a task 425. The task 425 can be at least one of the plurality of source tasks 115-1, 115-2, 115-3 and/or at least one of the plurality of target tasks 105-1, 105-2, 105-3, 105-*n*.

According to at least one example implementation, the decentralized training of parameters stored in the parameter datastore 110 can allow each task (e.g., target tasks 105-1, 105-2, 105-3, 105-*n*) to train the parameters asynchronously and ensure backwards compatibility. In this case, backwards compatibility ensures that as one task (e.g., target task 105-1) updates a parameter or parameters, a performance of other tasks (e.g., target task 105-2) that use the parameter datastore 110 should not change or deteriorate. Backwards compatibility can be ensured via a versioning system implemented in the parameter revision logic 410 and the parameter revision logic block 430. In an example implementation, the versioning system can be based on Laplace propagation.

As such, the parameter revision logic 410 is configured to implement a versioning check of a parameter as described below with regard to FIG. 5. Further, the parameter revision logic block 430 is configured to implement a versioning check of a parameter as described below with regard to FIG. 6.

Further, the version control datastore 415 can store a current value of a parameter and for each task $T_i$ (e.g., a source task and/or target task that uses the parameter) (1) an anchor point $\theta_i$ having the same dimensionality as $\theta$; and (2) a strength parameter $H_i$ which is also the same dimensionality as $\theta$ but with non-negative entries. Semantically, the values associated with the strength parameter $H_1$ can represent diagonal entries of the Hessian of a loss function for task $T_i$ in the neighborhood of $\theta$. The pair $(\theta_i, H_i)$ can be referred to as the approximate factor for task $T_i$.

In an example implementation, the version control datastore 415 can be a relational database with a table including tasks, a table including parameters having a current value for each parameter, a table including anchor points and a table including strength parameters. The version control datastore 415 can also include a table including historical values (e.g., to recover an earlier version). Each table can be linked and the tasked can be keyed such that a search, query or look-up of a task can filter the other tables to include only parameters, anchor points and strength parameters associated with the task (e.g., task $T_i$). Other searchable implementations of the version control datastore 415 are within the scope of this disclosure.

Although the version control datastore 415 is shown as an element of parameter server 405, the version control datastore 415 can be an element of some other server or computing device. Although the parameter revision logic block 430 is shown as an element of task node 420, the parameter revision logic block 430 can be an element of some other server or computing device.

Elements described with regard to FIGS. 1-3 can be implemented as program modules or functional processes include routines, programs, objects, components, data structures, etc., that perform particular tasks or implement particular data types and may be described and/or implemented using existing hardware at existing structural elements. Such existing hardware may include one or more processors, Central Processing Units (CPUs), digital signal processors (DSPs), application-specific-integrated-circuits, field programmable gate arrays (FPGAs) computers or the like. The at least one processor can be configured to execute instructions implementing the elements described with regard to FIGS. 1-3 that can be stored on the non-transitory computer readable storage medium.

Figure 5:
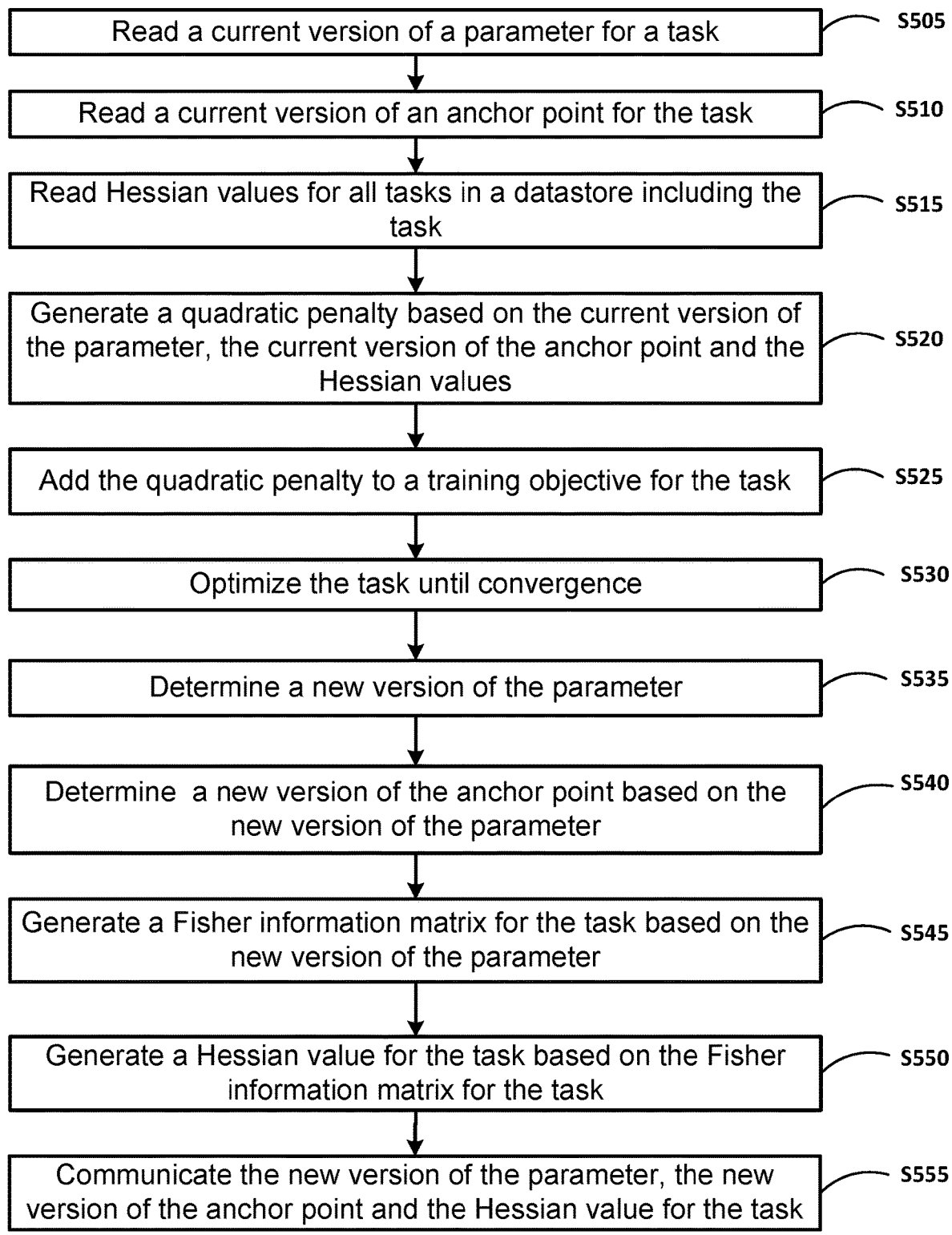
FIG. 5 illustrates a block diagram of a method according to at least one example embodiment.

FIG. 5 illustrates a block diagram of a method according to at least one example implementation. The steps associated with FIG. 5 can be triggered in response to generating a new parameter or set of parameters (e.g., by adding a new task and/or by changing a machine learning model associated with an existing task) to be stored in a parameter datastore (e.g., the parameter datastore 110). The steps associated with FIG. 5 can be triggered in response to an existing parameter or set of parameters stored in a parameter datastore (e.g., the parameter datastore 110) being changed and/or updated (e.g., in response to a training process). In an example implementation, the steps associated with FIG. 5 can be triggered in response to an existing parameter or set of parameters being retrained on one of the source tasks or target tasks (e.g., task $T_i$).

As shown in FIG. 5, in step S505 a current version of a parameter for a task is read. For example, the current version of the parameter for the task (e.g., task $T_i$) can be read from a version control datastore (e.g., version control datastore 415). The current version of the parameter for the task can be read from the results of a query or search (e.g., based on the task $T_i$) of the version control datastore. If the query or search of the version control datastore do not return a result (e.g., a new task is added and/or a first time training of a task), a new parameter vector ($\theta$) can be generated. The new parameter vector ($\theta$) can be a vector having a dimensionality corresponding to a number of input parameters associated with the task (e.g., task $T_i$) and/or to a default dimensionality as defined by the version control datastore (e.g., version control datastore 415) and/or the parameter datastore (e.g., the parameter datastore 110). The values associated with the new parameter vector ($\theta$) can be set to a default value (e.g., 0, 1, and the like) and/or defined by the task. In addition, the dimensionality of the new parameter vector ($\theta$) can be increased beyond that corresponding to a number of input parameters associated with the task and/or default dimensionality by zero-padding the new parameter vector ($\theta$).

In step S510 a current version of an anchor point for the task is read. For example, the current version of the anchor point (e.g., anchor point $\theta_i$) for the task (e.g., task $T_i$) can be read from the version control datastore (e.g., version control datastore 415). The current version of the anchor point for the task can be read from the results of a query or search (e.g., based on the task $T_i$) of the version control datastore. If the query or search of the version control datastore do not return a result (e.g., a new task is added and/or a first time training of a task), a new anchor point (e.g., anchor point $\theta_i$) can be generated. The new the anchor point (can be a vector having a dimensionality corresponding to a number of input parameters associated with the task (e.g., task $T_i$) and/or to a default dimensionality as defined by the version control datastore (e.g., version control datastore 415) and/or the parameter datastore (e.g., the parameter datastore 110). The values associated with the new anchor point can be set to a default value (e.g., 0, 1, and the like) and/or defined by the task. In addition, the dimensionality of the new anchor point can be increased beyond that corresponding to the number of input parameters associated with the task and/or default dimensionality by zero-padding the new anchor point.

In step S515 Hessian values for all tasks in a datastore including the task are read. For example, the Hessian values (e.g., strength parameters $H_j$) for all tasks (e.g., tasks T) can be read from the version control datastore (e.g., version control datastore 415). The Hessian values for the tasks can be read from the version control datastore by reading values directly from a table (e.g., a strength parameter table). In other words, the Hessian values for the tasks can be read from the version control datastore without performing a query or search (e.g., based on the task $T_i$) of the version control datastore. If the query or search of the version control datastore do not return a result (e.g., a new task is added and/or a first time training of a task), a new Hessian values (e.g., strength parameters $H_j$) can be generated. The new Hessian values can be a vector having a dimensionality corresponding to a number of input parameters associated with the task (e.g., task $T_i$) and/or to a default dimensionality as defined by the version control datastore (e.g., version control datastore 415) and/or the parameter datastore (e.g., the parameter datastore 110). The values associated with the new Hessian values can be set to a default value (e.g., 0, 1, and the like) and/or defined by the task. In addition, the dimensionality of the new Hessian values can be increased beyond that corresponding to a number of input parameters associated with the task and/or default dimensionality by zero-padding the new Hessian values.

In step S520 a quadratic penalty is generated based on the current version of the parameter, the current version of the anchor point and the Hessian values for other tasks, not including the task Tj which is being updated. For example, the quadratic penalty can be calculated using the equation shown as equation 1:

$$\frac{1}{2}\sum_{k\neq j}(\theta_i - \theta_{k,i})^2 H_{k,i} \quad (1)$$

where:
$L_j$ is the loss function for task j. In some applications $L_j$ can be the log likelihood $p(D_j|\theta)$, where $D_j$ is a training dataset for task $T_j$;
$\theta_k$ is the current version of the anchor point for task k; and
$H_k$ are the Hessian values for task k.

In step S525 the quadratic penalty is added to a training objective for the task. For example, the training objective can be represented as:

$$\lambda_j L_j(\theta) + \frac{1}{2}\sum_{k\neq j}(\theta_i - \theta_{k,i})^2 H_{k,i} \quad (2)$$

where:
$L_j$ is the loss function for task j. In some applications $L_j$ can be the log likelihood $p(D_j|\theta)$, where $D_j$ is a training dataset for task $T_j$;
$\lambda_j$ is an optional parameter which represents the relative importance of task $T_j$;
$\theta_k$ is the current version of the anchor point for task k; and
$H_k$ are the Hessian values for task k.

Additionally, the loss function may include an optional regularizer term, which can penalize complexity and can help prevent overfitting. The training objective including the quadratic penalty and a regularizer term results in equation 3:

$$\lambda_j L_j(\theta) + \frac{1}{2}\sum_{k\neq j}(\theta_i - \theta_{k,i})^2 H_{k,i} + \Omega(\theta) \quad (3)$$

In an example implementation, $\Omega$ can be a norm-based regularlizer including the $l_2$-norm: $\Omega(\theta)=\lambda\Sigma_j\theta_j^2$ which can penalize the parameters for being too large and the $l_1$-norm: $\Omega(\theta)=\lambda\Sigma_j|\theta_j|$ which can add sparsity to the parameters. The coefficient $\lambda$, controls how much the regularization term affects the training objective.

In step S530 the parameters are optimized until convergence or until a stopping criterion is satisfied by minimizing the loss function which includes quadratic penalties, task-specific loss term and optional regularizer term (e.g., Eqn. 3).

In some implementations, optimization can be performed only approximately. For example, the function might be replaced by a surrogate or approximate loss, or a bound, such as in variational learning.

In an example implementation, the task-specific loss function may correspond to a matrix factorization model. For example, the task may attempt to approximate SVD (singular value decomposition) of the adjacency matrix or other matrix derived from a graph. Different tasks Ti, Tj, . . . may correspond to different factorization models over different but related datasets. For example, one task might attempt to factorize the adjacency matrix of the bipartite graph encoding engagements between users and items, while another task might attempt to factorize the adjacency matrix of a follower graph encoding non-symmetric relationship between the same set of users. The parameters may be shared parameters between the tasks encoding the embeddings of users, or one of the factors in the matrix factorization models. Alternatively, in the same application, θ may encode parameters of a model used to calculate the embeddings from observable user features.

Optimizing until convergence may include gradient descent, stochastic gradient descent or a similar iterative algorithm which typically uses gradient information in each iteration in order to adjust parameters θ so a low value of the loss function is achieved.

In some implementations, such as when using stochastic gradient descent, the loss function being evaluated might change during training, for example by evaluating it on smaller subsets (often referred to as minibatches) of available data.

According to an example implementation, the quadratic penalties that can be added when retraining an old task or training on a new task can ensure that the performance on all other tasks is maintained at a reasonable level. The quadratic penalty can be understood as a second-order approximation to the sum of loss functions from all other tasks around the current version of the parameter, thus, the addition of the quadratic penalty simulates simultaneous training on all tasks.

In step S535 a Fisher information matrix is generated for the task based on the new version of the parameter (in some implementations, step S535 is optional). The Fisher information matrix I(θ) is a symmetrical (p×p) matrix containing information about the parameter vector. For example, the Fisher information matrix I(θ) can be calculated as:

$$I(\theta) = -E\left[\frac{\delta^2 \log L(\theta)}{\delta\theta\delta\theta'}\right] \quad (4)$$

where:
θ is the parameter vector;
log L(θ) is the log-likelihood of the parameter vector; and
E is the mathematical expectation or expected value.

In some models the Fisher information matrix, or diagonal entries thereof, can be calculated efficiently. For example, in neural networks, one can employ an algorithm similar to backpropagation to estimate this value. In some applications, and some tasks, this may be an efficient way to calculate the Hessian of the task loss.

In step S540 a diagonal entries Hessian (matrix of second derivatives), of the loss function $L_j$ is calculated, or estimated. In some models, one can use the Fisher information matrix for the task. The Fisher information matrix is sometimes called the negative Hessian matrix. Accordingly, the Hessian value H(θ) for the task can be calculated as −I(θ) or H(θ)=−I(θ). In other cases, the values of the Hessian may be approximated or calculated by other means, for example using the backpropagation algorithm twice, or by evaluating an analytical expression. The optional $\lambda_j$ task importance parameter can be incorporated in the Hessian values by multiplying the Fisher information.

In step S545 a new version of the anchor point for task $T_j$ is generated based on the new, optimized, version of the parameter, the Hessian calculated in the previous step, the anchor points and Hessian values for the other tasks which are obtained from the central parameter server. For example, the new anchor point can be updated using the following formula, which is consistent with a Taylor decomposition of the loss:

$$\theta_j = \frac{1}{H_{j,i}} \left( \theta_{*,i} \sum_k H_{k,i} - \sum_{k \neq j} H_{k,i} \theta_{k,i} \right) \quad (5)$$

where:
  $\theta_*$ is the optimized value of the parameter $\theta$ and $\theta_{*,i}$ is its i'th element,
  $H_k$ is the Hessian value for task $T_k$ and $H_{k,i}$ is its i'th diagonal entry. In the case of the task $T_j$ in question we use the new Hessian value obtained in the previous step,
  $\theta_k$ is the anchor point for task $T_k$, and $\theta_{k,i}$ is its i'th element.

In step S550 the new version of the parameter, the new version of the anchor point and the Hessian value for the task are communicated. For example, the task node 420 can communicate the new version of the parameter, the new version of the anchor point and the Hessian value for the task to the parameter server 405. The parameter server 405 may then continue the versioning check of the new version of the parameter.

Figure 6:
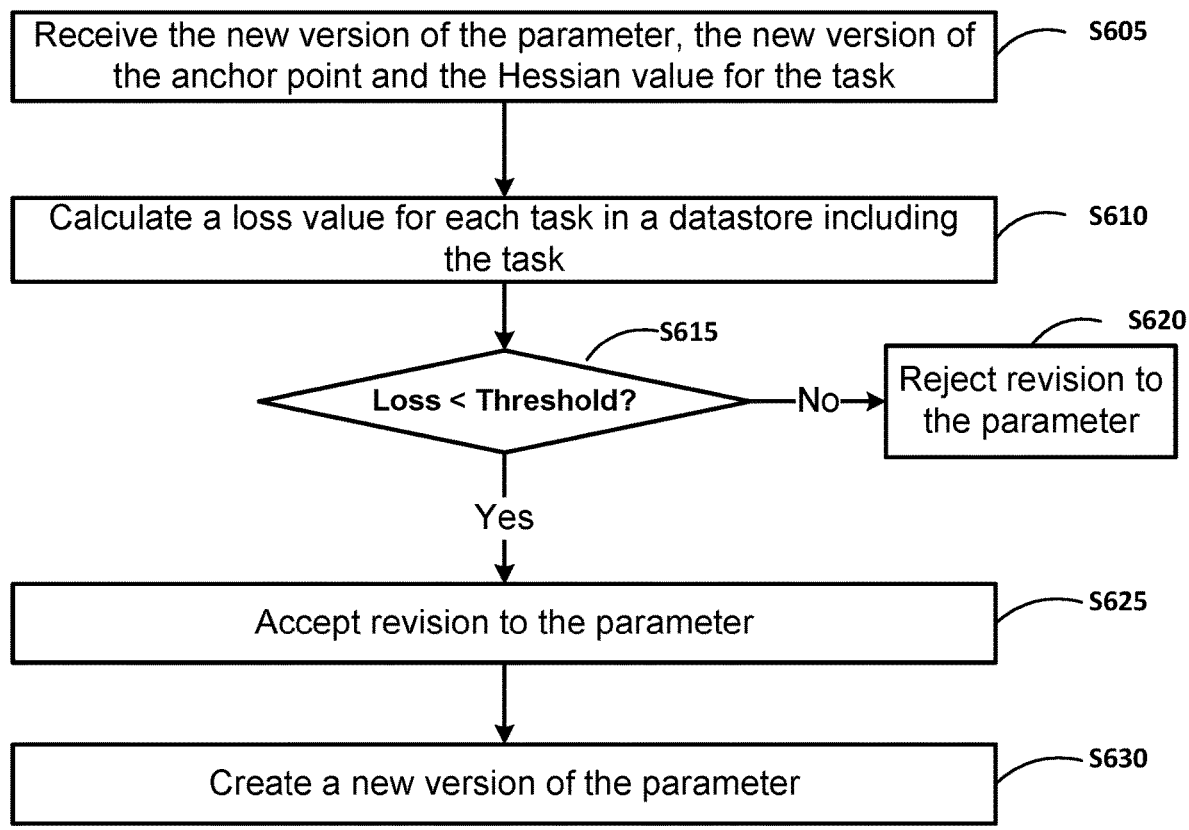
FIG. 6 illustrates a block diagram of a method according to at least one example embodiment.

FIG. 6 illustrates a block diagram of a method according to at least one example implementation. As shown in FIG. 6, in step S605 the new version of the parameter, the new version of the anchor point and the Hessian value for the task are received. For example, the new version of the parameter, the new version of the anchor point and the Hessian value for the task (as determined above) can be received by the parameter server 405 from the task node 420.

In step S610 a loss value for each task in a datastore including the task is calculated. For example, each of the plurality of target tasks 105-1, 105-2, 105-3, 105-n can be a machine learning task that uses the parameters stored in the parameter datastore 110 as input. Generally, a loss function Loss(x, y, w) quantifies how unacceptable a result would be if w is used to make a prediction on x when the correct output is y.

In an example implementation, the parameter revision logic 410 can be configured to use the new version of the parameter (for each task that uses at least a portion of the new version of the parameter as input) to calculate the loss value for each task in the parameter datastore 110. For example, the loss value can be calculated using a regression loss function (e.g., a Mean Square Error (MSE) regression loss function, a Mean Absolute Error (MAE) loss function, and the like). Accordingly, the loss for each task (target tasks 105-1, 105-2, 105-3, 105-n) can be calculated (e.g., using parameter revision logic 410) using the Mean Square Error (MSE) with the new version of the parameter, the new version of the anchor point and the Hessian value for the task as input for the tasks that use the new version of the parameter, the new version of the anchor point and the Hessian value for the task. An example, MSE loss function can be calculated as:

$$MSE = \frac{\sum_{i=1}^{n} (\theta_i - \theta_i^p)^2}{n} \quad (6)$$

In an example implementation, the parameter revision logic 410 can be configured to use the new version of the parameter, the new version of the anchor point and the Hessian value for the task to calculate the loss value for each task in the parameter datastore 110. For example, the loss value can be calculated using the quadratic penalty (e.g., Eqn. 1). Accordingly, the loss for each task (target tasks 105-1, 105-2, 105-3, 105-n) can be calculated (e.g., using parameter revision logic 410) using the quadratic penalty with the new version of the parameter, the new version of the anchor point and the Hessian value for the task as input for the tasks that use the new version of the parameter, the new version of the anchor point and the Hessian value for the task.

In some implementations, parameters can be weighted (e.g., a value used in the loss function may be equal to $w_{ij} * \theta_{ij}$) when calculating the loss for a task. For example, shared parameter A may be more important in target task 105-1 than in target task 105-2. Accordingly, the shared parameter A in the parameter vector ($\theta$) for target task 105-1 may be given a relatively higher weight (e.g., w=1) and the shared parameter A in the parameter vector ($\theta$) for target task 105-2 may be given a relatively lower weight (e.g., w=0.5) when calculating the loss for a task.

In step S615 whether the loss is less than a threshold value (or satisfies a condition) is determined. If the loss is not less than the threshold value (or does not satisfy the condition), processing continues to step S620. In step S620 the revision to the parameter is rejected. For example, the new version of the parameter, the new version of the anchor point and the Hessian value for the task can be discarded (e.g., erased from memory) or stored in a rejected parameter datastore (not shown). If the loss is less than the threshold value (or satisfies the condition), processing continues to step S625. In step S625 revision to the parameter is accepted. For example, the revision to the parameter can be used as input in a future execution of the task.

In an example implementation, a cumulative loss can be compared to the threshold value. For example, the loss for each task can be summed and compared to the target value. Each loss can be weighted. For example, shared parameter A may be more important in target task 105-1 than in target task 105-2. Accordingly, if the new version of the parameter (e.g., parameter vector ($\theta$)) includes a modification to parameter A, the loss for target task 105-1 may be given a relatively higher weight (e.g., w=1) and the loss for target task 105-2 may be given a relatively lower weight (e.g., w=0.5) when calculating the cumulative loss.

In an example implementation, the loss associated with each task can be compared to the threshold value. In this implementation, each of the tasks can be individually tested. In this implementation, each task may have an assigned threshold value. For example, a new task and/or a task with minimal training events can have a relatively higher threshold as compared to a task that has had a significant number of training events (e.g., a task that historically has minimal loss). The threshold(s) can be static and/or user defined. The threshold(s) can be dynamic. For example, the loss value for each task in the datastore can be calculated on a regular basis (e.g., as a scheduled event, hourly, daily, monthly, and/or the like) and stored (e.g., in version control datastore 415). In this way modified (e.g., newly trained) parameters may replace existing parameters if the loss is improved (e.g., the new loss is less than a previous loss value).

In an example implementation, the loss associated with each task can be added to or subtracted from a stored loss associated with each task. In this implementation, each of the tasks can be individually tested. In this implementation, the threshold value can be a range relative to zero (0).

In step S630 a new version of the parameter is created. For example, the current version of the parameter (e.g., current parameter vector ($\theta$)) can be archived, deleted marked for future archiving or deletion. Then the new version of the parameter (e.g., new parameter vector ($\theta$)) can be stored in the parameter datastore (e.g., the parameter datastore 110). Further, the version control datastore (e.g., version control datastore 415) can be updated with the new version of the parameter (e.g., new parameter vector ($\theta$)), the new version of the anchor point (e.g., new anchor point ($\theta_i$)) and the new Hessian value (new Hessian matrix $H(\theta)$) for the task Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations only and is not intended to be limiting of example implementations. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more processors, Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium, non-transitory computer readable storage medium and/or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

What is claimed is:

1. A method comprising:
   reading a first version of a parameter corresponding to an input of a task from a version control datastore;
   reading a first version of an anchor point for the task from the version control datastore;
   reading a set of Hessian values for a plurality of tasks including the task from the version control datastore;
   generating a quadratic penalty based on the first version of the parameter, the first version of the anchor point and the set of Hessian values;
   training the task using the quadratic penalty, wherein training the task using the quadratic penalty includes optimizing the quadratic penalty by changing the parameter until a stopping criterion is satisfied, wherein the stopping criterion is satisfied when a loss function that includes the quadratic penalty is minimized;
   determining a second version of the parameter based on the trained task;
   determining a second version of the anchor point for the task based on the trained task;
   generating Hessian values for the task based on the trained task;
   calculating a first loss value for a first portion of the plurality of tasks based on the second version of the parameter;
   calculating a second loss value for each of a second portion of the plurality of tasks;
   determining if the second loss value satisfies a condition and the first loss value does not satisfy the condition; and
   in response to determining the second loss value satisfies the condition and the first loss value does not satisfy the condition, replacing the first version of the parameter with the second version of the parameter in a parameter datastore and in the version control datastore.

2. The method of claim 1, further comprising:
   in response to determining the second loss value does not satisfy the condition, discarding the second version of the parameter, the second version of the anchor point, and the Hessian values for the task.

3. The method of claim 1, further comprising:
   in response to determining the second loss value satisfies the condition, storing the second version of the anchor point, and the Hessian values for the task in the version control datastore.

4. The method of claim 1, wherein the task is a first task, the method further comprising:
   assigning a first importance to the first task; and
   assigning a second importance to a second task, the first task and the second task being included in the first portion of the plurality of tasks and the second task being configured to use at least a portion of the first version of the parameter as an input, and
   wherein the calculating of the first loss value for the first portion of the plurality of tasks is further based on the first importance and the second importance.

5. The method of claim 1, wherein
   the stopping criterion is a convergence,
   the determining of the second version of the parameter includes selecting a first matrix from the optimized quadratic penalty;
   the determining of the second version of the anchor point includes selecting a second matrix from the optimized quadratic penalty; and
   the generating of the Hessian values for the task includes generating a Fisher information matrix for the task based on the second version of the parameter.

6. The method of claim 1, wherein
   the calculating of the first loss value for the first portion of the plurality of tasks includes using the quadratic penalty as a loss function, and
   the calculating of the second loss value for each of the second portion of the plurality of tasks includes using the quadratic penalty as the loss function.

7. The method of claim 1, wherein
   the calculating of the first loss value for the first portion of the plurality of tasks includes using a regression loss function, and
   the calculating of the second loss value for each of the second portion of the plurality of tasks includes using the regression loss function.

8. The method of claim 1, wherein
- determining the reading of the first version of the parameter does not return a result;
- in response to determining the reading of the first version of the parameter does not return a result, generating a new parameter, assigning values to the new parameter, and zero-padding the new parameter;
- determining the reading of the first version of an anchor point does not return a result;
- in response to determining the reading of the first version of an anchor point does not return a result, generating a new anchor point, assigning values to the new anchor point, and zero-padding the new anchor point;
- determining the reading of the set of Hessian values for the plurality of tasks does not return a result for at least one of the plurality of tasks; and
- in response to determining the reading of the set of Hessian values for the plurality of tasks does not return a result for the at least one of the plurality of tasks, generating new Hessian values for each of the at least one of the plurality of tasks, assigning values to the new Hessian values for each of the at least one of the plurality of tasks, and zero-padding the new Hessian values for each of the at least one of the plurality of tasks.

9. The method of claim 1, wherein two or more of the plurality of tasks are trained asynchronously.

10. The method of claim 1, wherein
- the plurality of tasks each include at least one source task communicatively coupled to the parameter datastore, the at least one source task being configured as a machine learning task to train parameters stored in the parameter datastore, and
- at least one target task is communicatively coupled to the parameter datastore, the at least one target task being configured as a machine learning prediction task or an optimization task that uses parameters stored in the parameter datastore as input to the at least one target task.

11. A system comprising:
- a parameter server including a version control datastore and a parameter datastore;
- a task node communicatively coupled to the parameter server and configured to:
  - read a first version of a parameter corresponding to an input of a task from the version control datastore;
  - read a first version of an anchor point for the task from the version control datastore;
  - read a set of Hessian values for a plurality of tasks including the task from the version control datastore;
  - generate a quadratic penalty based on the first version of the parameter, the first version of the anchor point and the set of Hessian values;
  - train the task using the quadratic penalty, wherein training the task using the quadratic penalty includes optimizing the quadratic penalty by changing the parameter until a stopping criterion is satisfied, wherein the stopping criterion is satisfied when a loss function that includes the quadratic penalty is minimized;
  - determine a second version of the parameter based on the trained task;
  - determine a second version of the anchor point for the task based on the trained task;
  - generate Hessian values for the task based on the trained task;
- the parameter server being configured to:
  - calculate a first loss value for a first portion of the plurality of tasks based on the second version of the parameter;
  - calculate a second loss value for each of a second of the plurality of tasks;
  - determine if the second loss value satisfies a condition and the first loss value does not satisfy the condition; and
  - in response to determining the second loss value satisfies the condition and the first loss value does not satisfy the condition, replace the first version of the parameter with the second version of the parameter in the parameter datastore and in the version control datastore.

12. The system of claim 11, wherein
- the parameter datastore includes at least one look-up table that stores a plurality of parameters as real-valued vectors having a dimensionality corresponding to a number of input parameters associated with at least one of the plurality of tasks, and
- the version control datastore includes at least one look-up table that stores data associated with the plurality of parameters as real-valued vectors having a dimensionality corresponding to a number of input parameters associated with at least one of the plurality of tasks.

13. The system of claim 11, wherein in response to determining the second loss value does not satisfy the condition, the parameter server is further configured to discard the second version of the parameter, the second version of the anchor point, and the Hessian values for the task.

14. The system of claim 11, wherein in response to determining the second loss value satisfies the condition, the parameter server is further configured to store the second version of the anchor point, and the Hessian values for the task in the version control datastore.

15. The system of claim 11, wherein
- the task is a first task;
- a first importance is assigned to the first task;
- a second importance is assigned to a second task, the first task and the second task being included in the first portion of the plurality of tasks and the second task being configured to use at least a portion of the first version of the parameter as an input; and
- wherein the calculating of the first loss value for the first portion of the plurality of tasks is further based on the first importance and the second importance.

16. The system of claim 11, wherein
- the stopping criterion is a convergence,
- the determining of the second version of the parameter includes selecting a first matrix from the optimized quadratic penalty;
- the determining of the second version of the anchor point includes selecting a second matrix from the optimized quadratic penalty; and
- the generating of the Hessian values for the task includes generating a Fisher information matrix for the task based on the second version of the parameter.

17. The system of claim 11, wherein
- the calculating of the first loss value for the first portion of the plurality of tasks includes using the quadratic penalty as a loss function, and
- the calculating of the second loss value for each of the second portion of the plurality of tasks includes using the quadratic penalty as the loss function.

18. The system of claim 11, wherein
the calculating of the first loss value for the first portion of the plurality of tasks includes using a regression loss function, and
the calculating of the second loss value for each of the second portion of the plurality of tasks includes using the regression loss function.

19. The system of claim 11, wherein
the plurality of tasks each include at least one source task communicatively coupled to the parameter datastore, the at least one source task being configured as a machine learning task to train parameters stored in the parameter datastore, and
at least one target task is communicatively coupled to the parameter datastore, the at least one target task being configured as a machine learning prediction task or an optimization task and that uses parameters stored in the parameter datastore as input to the at least one target task.

20. A non-transitory computer readable storage medium including instructions that when executed by at least one processor, cause the at least one processor to:
read a first version of a parameter corresponding to an input of a task from a version control datastore;
read a first version of an anchor point for the task from the version control datastore;
read a set of Hessian values for a plurality of tasks including the task from the version control datastore;
generate a quadratic penalty based on the first version of the parameter, the first version of the anchor point and the set of Hessian values;
train the task using the quadratic penalty, wherein training the task using the quadratic penalty includes optimizing the quadratic penalty by changing the parameter until a stopping criterion is satisfied, wherein the stopping criterion is satisfied when a loss function that includes the quadratic penalty is minimized;
determine a second version of the parameter based on the trained task;
determine a second version of the anchor point for the task based on the trained task;
generate Hessian values for the task based on the trained task;
calculate a first loss value for a first portion of the plurality of tasks based on the second version of the parameter;
calculate a second loss value for each of a second portion of the plurality of tasks;
determine if the second loss value satisfies a condition and the first loss value does not satisfy the condition; and
in response to determining the second loss value satisfies the condition and the first loss value does not satisfy the condition, replace the first version of the parameter with the second version of the parameter in a parameter datastore and in the version control datastore.

* * * * *